June 18, 1940.    J. H. MURCH    2,204,549
METHOD OF FORMING METALLIC CONTAINERS
Filed Sept. 25, 1937    3 Sheets-Sheet 1
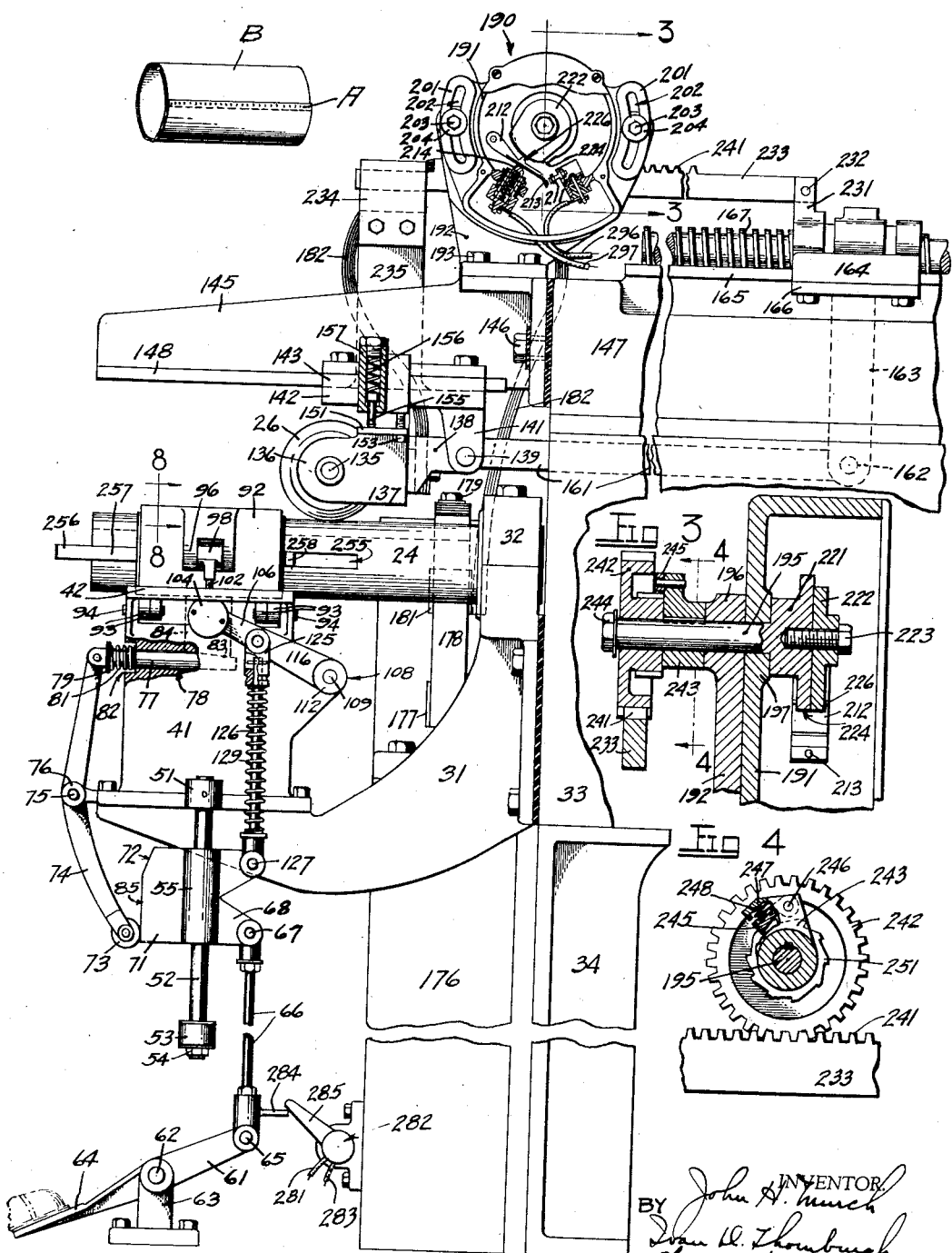

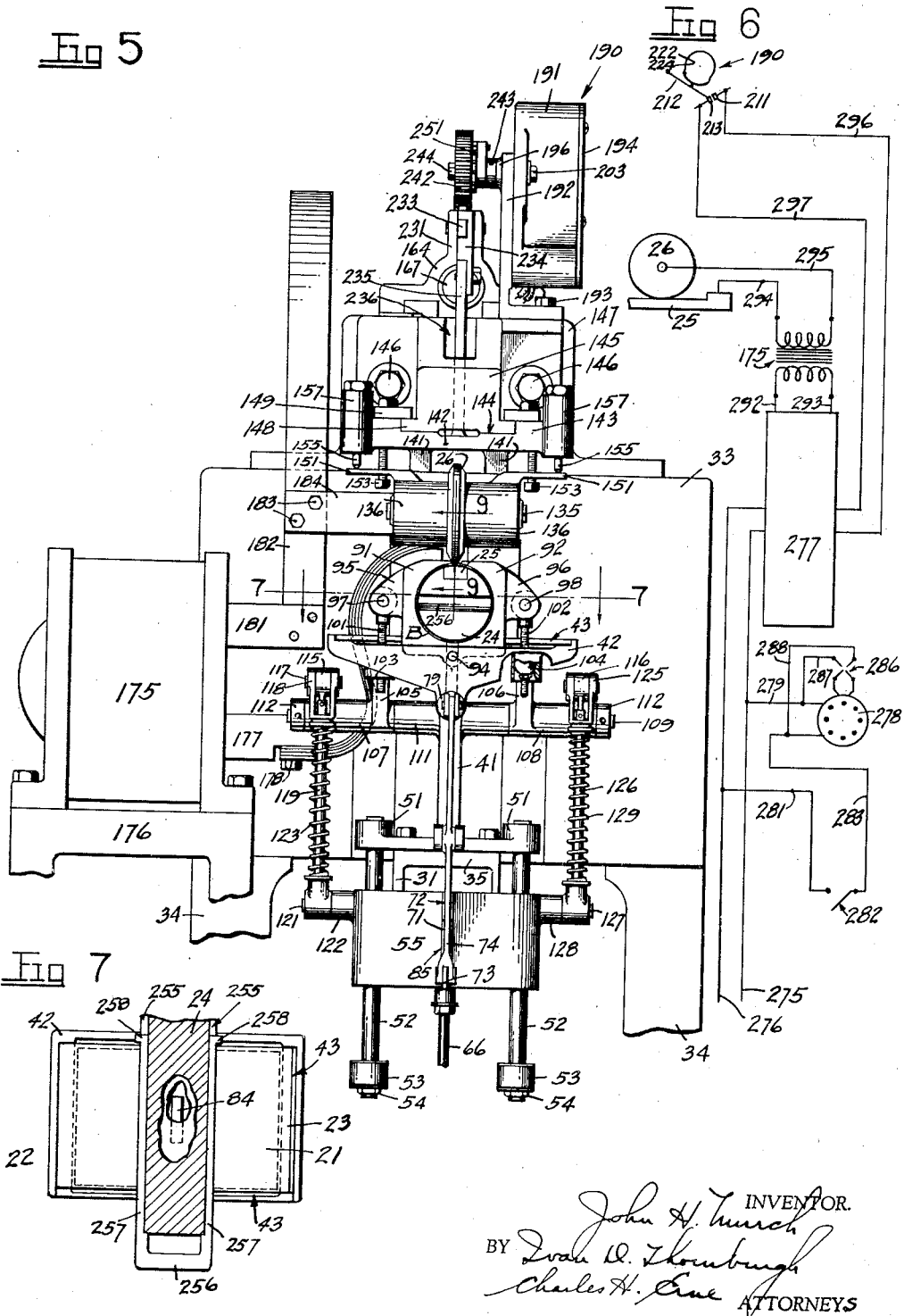

June 18, 1940.  J. H. MURCH  2,204,549
METHOD OF FORMING METALLIC CONTAINERS
Filed Sept. 25, 1937    3 Sheets-Sheet 3

INVENTOR.
John H. Murch
BY Ivan D. Thornburgh
Charles H. Cine
ATTORNEYS

Patented June 18, 1940

2,204,549

UNITED STATES PATENT OFFICE 2,204,549

METHOD OF FORMING METALLIC CONTAINERS

John H. Murch, East Orange, N. J., assignor to American Can Company, New York, N. Y., a corporation of New Jersey Application September 25, 1937, Serial No. 165,763

3 Claims. (Cl. 219—10)

The present invention relates to a method of welding and has particular reference to the formation of a continuous stitch or overlapped spot weld seam or joint construction on sheet metal wherein the seam or joint is created without extrusion of the metal at the end or ends of the seam or stated positively wherein the fused area boundary of the individual end weld spots are fully contained within the seam edge.

As an example of one adaptation of the present invention the process of can making is selected to illustrate the method steps of welding. In the early years of making cans having hermetic soldered side seams manufacturing difficulties were encountered when there existed even the smallest amount of projection or extrusion of any part of the body side seam such as might be produced by misalignment of the overlapping parts or by excess of solder. It has also been found in welding relatively thin sheet metallic material that any irregularities of welding in the nature of projections or extrusions of the parts even in relatively small amounts will present as bad or worse manufacturing difficulties as far as making hermetic seams is concerned.

The present invention is directed to producing commercially welded seams in sheet metal, and the making of side seam can bodies having no welding extrusions at the ends of the seams will be particularly featured by way of example.

Extrusion or projection of metal may be said to be inherent in continuous resistant spot or stitch welding on relatively thin sheet metal because the application of the full force of welding heat and pressure at the extreme ends of the overlapped parts of the seam result in too great a concentration of heat and pressure in too small an area. In other words, the end stitches or spots of commercially welded seams of light gauge metal by virtue of the continuous welding process are so close to the ends of the seam that the molten metal in that area necessarily pushes out beyond the sheet edge where it appears as an extrusion.

The present invention is particularly concerned with a method of welding relatively light gauge sheet metal to produce a continuous stitch or spot welded side seam or other joint which is hermetic and effectively welded throughout its full extent by a seam having no projections or extrusions of the metal at the seam ends. Such a welding is produced by resistant electric welding which is effectively applied in a new manner.

An object of the present invention is the provision of a method of metallic seam welding of relatively light gauge sheet metal which method produces welded seams having the engaged elements secured together in an intimate and permanent union by means of a series of stitch or spot welds in which the end spots or stitches are so placed relative to the end of the seam that there will not be any metal extrusion of the welded seam parts.

A further object of the invention is the provision of a method of welding side seams of metallic can bodies in which the first and last weld stitches or weld spots are so placed relative to the ends of the seam that there is sufficient heat and pressure effective at the adjacent extreme or terminal seam ends to make the proper weld but not enough to cause extrusion of metal beyond the terminal seam ends.

Another object is the provision of a welding method for producing a composite or combined butted and overlapped welded seam by welding together a straight edge part and an offset edge part wherein these two edge parts are engaged and crowded together during the heating or fused action of the weld thereby securely welding and joining the parts together in a seam the ends of which are not extruded.

Numerous other objects and advantages of the invention will be apparent as it is better understood from the following description, which, taken in connection with the accompanying drawings, discloses a preferred embodiment thereof.

Figure 1 is a perspective view of a welded can body of light gauge material having a welded side seam made by the method steps of the present invention;

Fig. 2 is a side elevation partially broken away of a welding apparatus adapted for welding the side seam of a can body of the type shown in Fig. 1;

Fig. 3 is an enlarged sectional detail taken substantially along the line 3—3 in Fig. 2;

Fig. 4 is a fragmentary sectional detail partly broken back as viewed along the section line 4—4 in Fig. 3;

Fig. 5 is an end elevation of the apparatus as it would appear if viewed from a position to the left of Fig. 2;

Fig. 6 is a wiring diagram of the electrical circuit employed in the welding apparatus of Figs. 2 and 5;

Fig. 7 is a plan sectional detail partly broken back and showing a can body clamping device which is associated with a welding horn as viewed substantially along the line 7—7 in Fig. 5;

Figure 8:
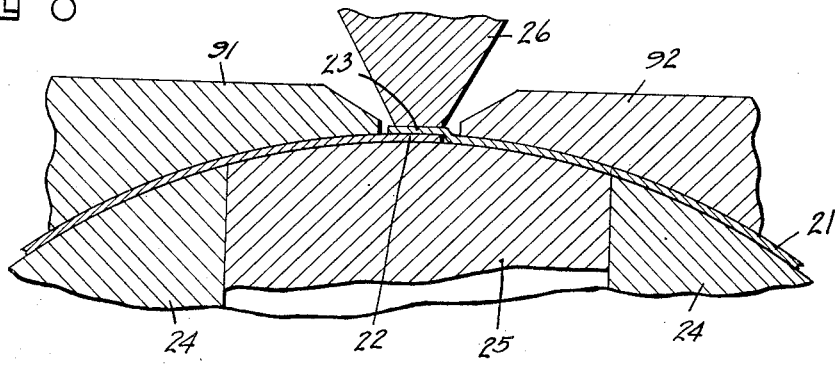
Fig. 8 is a transverse sectional and schematic view on an enlarged scale of the can body seam sections as they appear at the time of welding, the view also showing adjacent apparatus parts.

The present invention is directed to method steps of providing a new result in seam welding. The drawings illustrate essential parts of a welding apparatus which utilize the so-called resistant welding system of producing longitudinally extending continuous and stitch welded seams or joints. Such an apparatus in addition to the usual welding horn for supporting the work and movable electrodes for traversing the seam, contain provisions for electrically controlling to a high degree of accuracy the timing of the weld so that the end or terminal edge stitches or spot welds produce a fully welded or fused area in the metal. The boundary of such an end spot extends just to the terminal edge of the seam so that the fused section of the seam is not distorted or extruded beyond the normal boundary of the sheet metal part being welded.

In order to further exemplify the method steps of the invention the welding of the side seam of a can body is disclosed in some detail. To produce such a side seam the edge parts of the body which form the seam are brought together and while held in engagement are permanently secured together. A continuous seam results, being produced by longitudinally welding the engaged body wall parts.

A can body of tubular form as shown in Fig. 1 is produced by first forming a flat body blank 21 (Fig. 7) into tubular shape by bringing opposite edges of the blank into engagement for the welding step. Such a blank may be formed with one straight edge 22 (see also Fig. 8) and one offset edge 23. As the flat blank is shaped into tubular form it is clamped on a welding horn designated generally by the numeral 24.

Suitable clamping members are used to bring together and to hold the straight edge 22 and the offset edge 23 while the engaged sections of the blank are welded. The welding is done by traversing the engaged parts longitudinally in a series of stitch or spot welds. In the welding apparatus shown in the drawings a lower stationary electrode 25, which is inserted in the horn 24, provides one side of the resistance welding circuit and a movable rotating roller electrode 26 which is caused to traverse the seam longitudinally provides the other side.

At the time of applying the welding heat for each stitch weld and under the pressure of the electrodes 25, 26 acting upon the engage seam parts, the metal of the can body between the electrodes is heated to a very high temperature and this metal becomes molten in a confined area or spot. The boundary of the individual area extends only a relatively short distance from a center line passing through the point of tangential contact of the electrodes.

Figure 9:
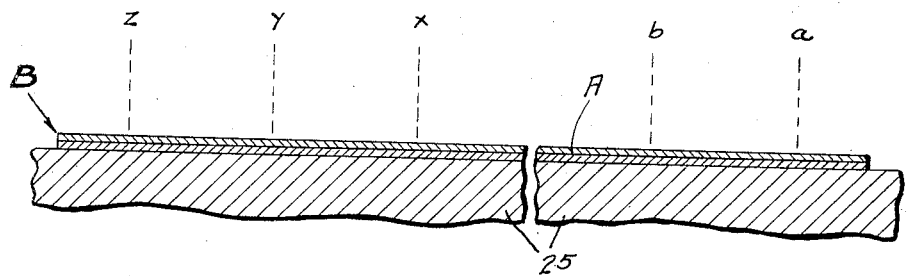
Fig. 9 is a schematic view showing a longitudinal section through the welded seam.
Figure 10:
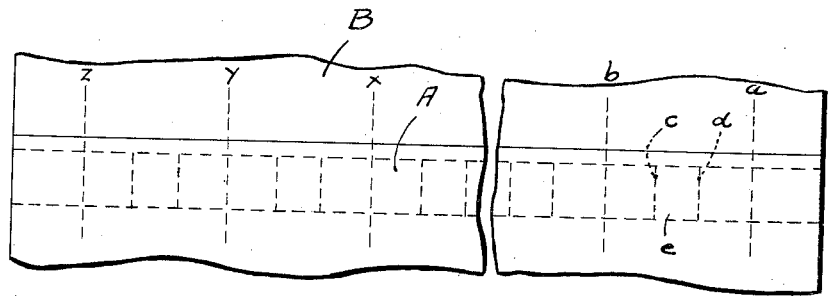
Fig. 10 shows a schematic face or plan view of the welded side seam.

This weld procedure is graphically illustrated in Figs. 9 and 10. The first application of the welding heat is made at the dotted center line $a$. This is a tangential line through the electrodes as just described and is a definite distance inside of the adjacent seam edge. The next adjacent spot weld is centered at the dotted line $b$ and it will be observed that the space between $a$ and $b$ which may be considered as designating the interval or distance between stitch welds is greater than the distance of the line $a$ from the terminal end of the seam or blank edge.

In this second adjacent spot weld since the boundary of the fused metal extends on both sides of the line $b$ this fused area overlaps the fused area of the first spot which was concentrated along the line $a$. In Fig. 10 the boundary line of the first spot is designated by the dotted line $c$ whereas the boundary line of the second spot is designated by the dotted line $d$. Thus it will be seen that there is an intervening layer $e$ in which the metal of the seam has been twice reduced to molten condition. This overlapping of the stitch spots insures a complete union of parts for a continuous, uninterrupted hermetic joint.

Subsequent spot welds are made continuing throughout the seam length the center lines of the last three spots being indicated respectively by the letters $x$, $y$, $z$. Z the last spot in the seam like the first spot is spaced inwardly from the terminal edge part of the seam and this is less than the distance between adjacent spots that is between $a$ and $b$, $x$ and $y$, or $y$ and $z$. This again insures that the end part of the seam extending beyond the line $z$ is fully welded but the fused area does not extend beyond the seam edge. The resulting fully welded side seam is designated by the letter A and this completes the forming of a can body B (Fig. 1) from the blank 21.

Reference should now be had to Figs. 2 and 5 wherein is shown the principal parts of a welding mechanism for utilizing the present invention method. As shown in the drawings, the horn 24 is preferably mounted on a bracket 31, a cap 32 bolted to the bracket holding the horn in stationary position. Bracket 31 is secured to a main body frame, designated generally by the numeral 33, and this frame may be supported on legs 34.

The bracket 31 is preferably formed with parallel sides which at the forward end are unitel in a horizontal web 35. This provides support for the can body blank receiving, blank holding, blank forming and can body clamping devices.

An intermediate bracket housing 41 is mounted on and is bolted to the bracket 31 and is located directly below the forward end of the horn 24. The housing 41 at its upper end is formed into a horizontally disposed table 42 (see also Fig. 7) which provides the receiving and gauging support for the body blank 21. The table 42 is formed with a blank receiving pocket 43 into which the blank 21 fits snugly when the latter is placed therein. The pocket 43 provides for accurate gauging of the position of the blank relative to the welding horn 24. All of the blanks are of the same size and when properly positioned within the pocket preparatory to welding, the straight edges 22 and the offset edges 23 of the blanks come into the same exact positions relative to the welding horn.

The central longitudinal part of the blank 21 as it rests in the pocket 43 of the table is practically touching the horn 24. Provision is made for holding the blank in its exact position relative to the horn so that this register will not be disturbed when the blank is wrapped around the horn. This holding action is effected by a wedge device which is operated by means of a foot treadle, the foot treadle also actuating hinged clamping wings which wrap the blank on the horn and form it into can body shape.

The base of the housing 41 carries a pair of laterally disposed bosses 51 which provide anchorage for a pair of vertically disposed depending studs 52. A collar 53 is threadedly secured to the lower end of each stud and is held in adjusted vertical position by a lock nut 54. The rods 52 provide slideways for a cross head 55 which is adapted to be raised and lowered by the foot treadle.

This foot treadle is formed as a pivotal lever 61 which rocks upon a pin 62 carried in the upper end of a floor block 63. The lever 61 is formed at its outer or forward end with a foot engaging treadle pad 64 which when depressed rocks the lever upon its pivotal mounting.

The inner end of the lever 61 is pivotally connected at 65 to an adjustable connecting rod 66 the upper end of which is pivotally secured at 67 to a lug 68 formed as a part of the crosshead 55. This connected construction insures that when the foot treadle is depressed at its pad section end the cross head 55 is lifted.

Cross head 55 is formed with a front rib 71 the upper corner of which is cut away in an inclined cam surface 72 and when the cross head is in its normal, lowered or unactuated position the cross head is down where it rests upon the collars 53. In this lowered position the cam surface 72 is engaged by a roller 73 carried on the lower end of a vertically disposed lever 74 which is pivotally mounted on a pin 75. The pin 75 is carried in lugs 76 formed on the forward central part of the base of the housing 41.

The upper end of the lever is pivotally connected to the forward end of a horizontally disposed slide pin 77 which is movable within a horizontal bore 78 formed in the housing 41 just below the table 42. The front end of the pin 77 carries a washer 79 and a coil spring 81 is mounted on the pin between the washer 79 and the front wall of the housing 41. The rear end of the spring is centered in a pocket 82 formed in the housing.

The lever 74 has two positions and is in its counter-clockwise position when the spring 81 is expanded. The inclined cam surface 72 is then engaged by the roller 73 and this cam surface provides a limit for this position of the lever. At such time the sliding pin 77 is out or in forward position.

The inner end of the pin is formed with an inclined top surface 83 which in the counter-clockwise position of the lever is drawn back so as to permit the inclined lower surface of a wedge block 84 (Figs. 2 and 7) to rest in lowered position. The wedge block is located in the horn 24 and has slight vertical movement in a slot cut in the horn. The block at all times rests upon the inner end of the sliding pin 77 and when the block is in its lowered position it is slightly below and out of contact with the lower surface of the can body blank 21 resting in the table pocket 43.

When the foot treadle 74 is engaged and the cross head 55 is lifted the cam surface 72 on the crosshead is moved up and beyond the roller 73 which thereupon rides along a vertical surface 85 formed on the forward edge of the web 71 this position being shown in Fig. 2. As the roller 73 is passing from the inclined surface 72 onto the vertical surface 85, the lever 74 swinging on its pivotal center 75 in a clockwise direction and this action forces the pin 77 inwardly compressing its spring 81.

The inclined surface 83 of the pin sliding beneath the inclined lower surface of the wedge block 84 causes the latter to move up against the lower surface of the blank 21 and to lock the blank against the supporting horn 24. This constitutes the holding of the blank previously referred to.

Raising of the cross head 55 not only clamps the blank against the horn as just described but also effects a wrapping of the blank around the horn and this wrapping action culminates in a final clamping of the blank, then in the form of a tubular body, with its engaged seam edges held in position for welding. This wrapping and forming action is brought about by hinged forming wing members which will next be described.

The forming wing members comprise wings or jaws 91, 92 which are provided with depending lugs 93. The lugs 93 are mounted on pivot pins 94 carried by the table 42 (Fig. 2). Each wing has two such lugs 93 one at the front edge of the wing and one at the back. There are also two pivot pins 94 one in the front and one in the back. This mounting permits hinging of the jaws from the normal or lowered position, where the jaws are below and out of contact with the flat body blank 21 as it rests in the table pocket 43, into a raised or clamping position such as is shown in Figs. 2 and 5.

Wings 91, 92 are also provided with side lugs 95, 96 which form pivotal connections 97, 98 for the upper ends of adjustable rods 101, 102. The lower ends of the rods 101, 102 are adjustably carried in ball and socket joints 103, 104 which provide for loose connections with the forward ends of lever arms 105, 106. The lever arm 105 is formed on a sleeve boss of a bell crank 107 and in like manner lever arm 106 is an integral part of a sleeve boss of a bell crank 108.

A horizontal shaft 109 is held in a central hub section 111 formed as an integral part of the housing 41 this hub section extending on both sides of the housing. The bell cranks 107, 108 are loosely mounted on the supporting shaft 109 at opposite ends and engage against the outer ends or faces of the hub section 111. Collars 112 are pinned on the ends of the shaft 109 and confine the bell cranks 107, 108 in rocking position upon the shaft.

Bell crank 107 is formed with a second lever arm 115 and in like manner bell crank 108 is an integral part with a second lever arm 116. The lever arms 115, 116 are yieldably and indirectly connected with the cross head 55.

The lever arm 115 is pivotally connected at 117 with a yoke block 118 and the upper end of a vertically disposed rod 119 extends into the yoke member. Rod 119 is pivotally connected at the bottom to a stud 121 which projects outwardly from a boss 122 formed on one side of the cross head 55. A spring 123 is located on the rod 119 and provides a yielding element between cross head and yoke for the clamping jaw 91.

The length of the spring and the rod is such as to provide for immediate rocking of the lever arm 115 as soon as the cross head 55 is raised by depressing the foot treadle lever 61. This insures that the clamping arm 91 wraps the left half of the body blank (as viewed in Fig. 5) around the forming horn 24 prior to the wrapping of the other side. This will be further explained.

In like manner the lever arm 116 carries a yoke member 125 into which the upper end of a vertically disposed rod 126 extends. The rod 126 at its lower end is mounted upon a stud 127 which is carried in a laterally extending boss 128 formed on the side of the cross head 55. A spring 129 provides a yielding element between cross head and yoke for the clamping jaw 92. The length of the spring 129 and the rod 126 is such as to allow for a slight lost motion at the beginning of the upward movement of the crosshead 55 and therefore the raising of or the hinging action on the clamping jaw 92 is delayed sufficiently to allow the clamping jaw 91 to first be brought into fully clamped position before seating of the jaw 92.

This timing of the clamping action of the jaws 91, 92 results in an initial laying down of the straight edge 22 (Fig. 8) of the body blank 21 against the stationary electrode 25 carried within the horn 24, prior to bringing in of the other or offset side of the body blank. After the straight edge 22 is in fully clamped position then the offset edge 23 of the body blank is laid down on top of the straight edge. This final jaw movement is accomplished in the last part of the raising action of the cross head during which time the jaw 91 does not move its yielding element 123 permitting the full upward stroke of its rod 119 which slides within the yoke.

It has been found that a welded side seam having a straight edge part 22 and an offet part 23 results in a better connection for the seam parts. In addition to the overlapped position of the edges of the blank there is also a crowding together or an abutting action between the terminal edge of the straight seam part 22 and the side wall of the pocket formed by the offset 23. The blank edges held as shown in Fig. 8 are now ready for welding.

The movable roller electrode 26 is loosely mounted upon a shaft 135 (Figs. 2 and 5). This shaft is held in bearings 136 formed in a roller cage block 137 which at its rear end projects backard in a lug section 138. This lug is mounted for pivotal movement on a horizontally disposed pin 139 which is carried in depending lugs 141 which project downwardly from a sliding carriage block 142.

The carriage block 142 is formed with thicker sides 143 which provide a slide pocket 144. The carriage block is adapted to move along a horizontal path so that the roller electrode 26 moves forward and back along the length of the clamped edges of the body held in position on the horn 24. A hollow bracket 145 is secured by bolts 146 to an upper frame 147 which may be an integral part of the body frame 33.

The bracket 145 is formed with an enlarged bottom or foot portion 148 which extends over and is spaced above the welding horn 24. The foot portion 148 is adapted to be received within the pocket 144 formed in the carriage block 143 and slide plates 149 are bolted on top of the sides 143 of the carriage block and these extend over the top surfaces of the bracket foot 148. This construction constitutes a sliding connection between the carriage block and the bracket 145 and insures a true horizontal travel of the block.

The roller cage block 137 is formed with upper walls 151 which project laterally on both sides of the block and which are located directly under the carriage block 142. Two vertically disposed bolts 153 are threadedly secured at opposite sides of the carriage block 142 and these extend down through openings formed in the upper walls 151 of the roller cage block. These bolts 153 hold the block in substantially horizontal position and swinging from its pivotal connection 139. An adjusted position of the head of each bolt 153 acting as a support insures the desired exact location of the block in a lowered position, this being disclosed in Fig. 2 of the drawings. In this lowered position the roller electrode 26 just clears the horn 24.

Block 137 is yieldingly held in lowered position by a pair of spring pressed pins 155, one on each side of the block. Each pin 155 is yieldingly held against its wall part 151 being backed up by a spring 156 which is housed within a boss 157 formed adjacent the side walls 143 of the carriage block 142. This insures that the bolt heads 153 hold the roller electrode in its adjusted lowered position relative to the horn 24 as just described.

The carriage block 142 together with the roller electrode 26 and its cage block 137 and all parts directly associated therewith are moved back and forth in a welding cycle. To permit application of driving power for this purpose a connecting link bar 161 is pivotally secured to the pin 139 and extends rearwardly to a connection at 162 which is made with the lower end of a projection 163 which extends down from a sliding feed block 164.

Feed block 164 is adapted to move back and forth on a horizontally disposed track plate 165 which is formed as an integral part of the upper frame 147. Slide plates 166 are bolted onto the block 164 and extend below the track 165 to keep the block in proper position and to insure smooth horizontal sliding movement.

Forward and backward movement of the slide block 164 may be obtained in any desired manner as by suitable driving connection with a motive driving power such as an electric motor. To further suggest such a driving unit a horizontally disposed feed worm 167 is shown in the drawings. Worm 167 has threaded engagement within the slide block 164 so that when the worm is rotated in one direction, the block is moved forward along its track 165 and when rotated in a reverse direction the block is moved back along its track. This rotating movement of the worm 167 may be effected through suitable connection with a reversible motor so that when the motor is operated in one direction the block 164 and all parts connected therewith including the roller electrode 26 will be moved forward and when the motor is reversed, the block and its parts will be retracted. Operation of such a reversible motor will be further explained in connection with the wiring diagram of Fig. 6.

As the roller electrode 26 advances over the held body blank edges 22, 23 the welding is consummated. When the roller first engages the double thickness of metal of the seam parts 22, 23 of the clamped body blank, it is raised from its lower position, the roller cage block 137 pivoting on the pin 139. The yielding pins 155 are thus moved upwardly to partially compress the springs 156. The reason for the pivot mounting of the block will now be apparent and in this manner the roller electrode 26 accommodates its position to the thickness of seam while at the same time the yielding action imposed by the springs 156 and pins 155 provide for the necessary pressure to insure proper welding.

As indicated in Fig. 2 of the drawings, the horn 24, its supporting bracket 31 and parts carried thereby are insulated from the frame of the machine. In like manner the bracket 145 is insulated. This permits isolation of the welding current in proper manner between the horn 24 on one side of the circuit and the roller electrode 26 on the other side. This will be further explained in connection with the wiring diagram.

A proper welding current is made effective by the use of a suitable transformer, designated generally by the numeral 175 (Fig. 5) which is mounted upon a supporting frame 176. A lower contact bar 177 extends out from the transformer 175 and provides a suitable electrical connection for the lower end of a laminated buss bar 178 the upper end of which is bolted at 179 to the rear end of the welding horn 24. An electrical connection between one side of the transformer and the horn 24 is thus provided.

An upper contact bar 181 also extends out from the transformer 175 and is disposed in parallel position with the bar 177. The bar 181 provides for connection with the lower end of a laminated buss bar 182 the other end of which is secured at 183 to a laterally disposed contact bar 184. The bar 184 is bolted to and is in electrical connection with the roller cage block 137. This provides for electrical connection between the upper electrode 26 and the opposite side of the transformer 175.

Provision is made for accurately controlling the timing of the welding circuit and for coordinating the same relative to the position of the roller electrode 26 as it moves forward. This feature will now be fully explained and reference should be had to Figs. 2, 3, 4, and 5.

A timing switch, indicated generally by the numeral 190, is contained within a switch box 191 adjustably mounted upon a bracket 192 which is bolted at 193 to the bracket 145. A cover 194 is fastened to the open front of the box to enclose its contents. As best illustrated in Fig. 3, a shaft 195 extends through a bearing 196 formed on the upper end of the bracket 192 and this shaft projects through a boss section 197 formed in the back wall of the switch box 191.

The switch box may be shifted on the bracket 192 by slight rotation about the shaft 195 and is adapted to be held in an exact adjusted position relative to the bracket. For this purpose the switch box 191 is formed with two oppositely disposed laterally extending lugs 201 (Fig. 2) each lug being slotted at 202 to provide clearance for a clamping bolt 203. Bolt 203 is threadedly secured into the upper wall of the bracket 192 laterally of its bearing 196.

Washers 204 are used with the bolts 203 and when the switch box 191 is brought into the exact desired position relative to the bracket 192 it is securely held in such adjusted position by tightening the bolts 203 so that the head of each bolt forces its corresponding washer 204 against the lug 201. Certain contact switch elements are carried in the switch box, as will be hereinafter more fully explained, and this setting of the gear box together with the parts secured thereto allows for exact positioning of such switch elements.

The switch box 191 carries a fixed contact member 211 which is fastened to a wall of the switch box and which is so insulated as to electrically isolate the contact member 211 from the switch box. A second contact element is also provided, this including a movable lever arm 212 which is pivotally mounted in the switch box and which carries a movable contact member 213. The lever arm 212 is backed up by a spring pressed barrel 214 which is slidably mounted in but is insulated from the switch box 191. This spring pressed barrel 214 engages at all times the movable lever arm and at the same time provides for direct electrical connection with both the lever arm and its movable contact 213.

Shaft 195 (Fig. 3) is formed with a head 221 which extends inside of the switch box 191 and this head carries a cam segment 222 (see also Fig. 2). The cam segment 222 is mounted on a cap screw 223 which is threadedly secured in the center of the shaft head 221 and which provides for an adjustable clamping of the cam member 222 relative to the shaft 195. The periphery of the head 221 is cut away in part to leave a cam surface 224 which is adapted to cooperate with the cam 222 to provide a combined effective length of cam surface. By adjusting the position of the cam 222 on the shaft head the effective cam surface may be shortened or lengthened to change the timing of the switch 190.

The lever arm 212 is formed with a projecting ridge 226 which is adapted to be engaged by either or both cam surfaces 222, 224 when these parts rotate past the ridge. As long as the ridge is so engaged the lever arm is held in the position indicated in Fig. 2 and its movable contact 213 is out of contact with the fixed contact 211 and switch 190 is open. When in this position the welding current cannot flow as will be hereinafter more fully explained.

It is to effect a more delicate timing of this making and breaking of the welding circuit at the contacts 211, 213 that the adjusting features of the switch are provided. These adjusting features it will be recalled relate to the positioning of the switch box 191 relative to the bracket 192 which times the stationary contact 211 and the adjustment of the cam member 222 relative to the shaft head 221 which times the movable contact 213.

The shaft 195 is adapted to be turned in one direction only this being when the electrode 26 is moving forward over the clamped blank edges of the can body and over the horn 24. To effect this one way rotation of the shaft a pawl and ratchet construction is provided and reference should now be had to Figs. 2, 3 and 4. The feed block 164 carries a forward upstanding projection 231 which is connected at 232 to a horizontally disposed bar rack 233. The forward end of the rack is clamped by a plate 234 (see also Fig. 5) to the upper end of a bar 235 which may be an integral part of the carriage block 142. As illustrated in the drawings this bar 235 extends up and has movement within a slot 236 formed in the hollow bracket 145. The bar rack 233, the feed block 164 and the carriage block 142 with its electrode 26 therefore move forward and backward as a unit, the bar rack acting as an upper tie member for the moving parts above the actuating worm 167.

Teeth 241 formed on the upper surface of the bar rack 233 (see Figs. 3 and 4) engage the teeth of a hollow gear 242 which is loosely mounted upon the outer end of the shaft 195. A ratchet block 243 is keyed to the shaft 195 and is interposed between the bearing 196 of the bracket 192 and the gear 242. A cap screw 244 is threadedly engaged in the outer end of the shaft 195 and holds the gear 242 on the shaft and against the wall of the ratchet block 243.

The ratchet block 243 carries a spring pressed ratchet dog 245 which is pivotally mounted at 246 so that it has slight swinging movement toward and away from the shaft 195. An outer portion of the ratchet block 243 is formed with a wall 247 that extends outside of the ratchet dog 245 and a spring 246 is interposed between this wall and the dog. The hub of the gear 242 is formed with ratchet teeth 251 and the dog pressed in by the spring engages these teeth.

When the gear 242 is moved in clockwise direction (Fig. 4) by the forward movement of the bar rack 233, a tooth of the ratchet 251 catches the ratchet dog 245 and locks the parts together. This rotates the shaft 195 and with it the cam sections 222 and 224.

The full forward movement of the rack 233 effects one complete rotation of the shaft 195 and the cam sections. Shortly after the beginning of such rotation the cam surfaces pass beyond the projection 226 of the lever arm 212 whereupon the arm moves up and its contact 213 engages the contact 211 closing the welding circuit. In point of time this is when the roller electrode 226 reaches the position *a* (Fig. 9). The welding continues while the roller electrode traverses the seam until the electrode reaches a point corresponding to the position *z* on the seam when the welding circuit is broken. This break is made by the cam surface 222 again engaging the projection 226 of the lever arm 212, which immediately separates the contacts 211, 213.

The roller electrode still continues its forward advance and when it leaves the seam the supporting bolts 153 prevent the roller from touching the horn. This forward movement continues as long as the actuating motor is driving forward. When the motor reverses, the carriage block 142, electrode 26 and parts making up the movable unit stop moving forward and then move back. This reversing of the motor is automatically effected by a suitable reversing switch which will be referred to again in the description of the wiring diagram of Fig. 6.

The carriage block unit moves back without stopping as long as the motor operates in reverse and the bar rack 233 moves with it. On the reverse movement, however, the ratchet teeth 251 of the gear 242 merely pass by as the dog 245 snaps over the teeth without locking the ratchet block 243 to the rotating gear. The shaft 195 therefore remains stationary and the cam elements 222, 223 remain in the position shown in Fig. 2 during which time the contacts 211, 213 are open.

Thus it will be seen that no welding takes place during the return of the roller electrode 26 as it merely rolls back over the welded seam. In Fig. 2 is shown the backward position of the roller electrode this being the starting position and this is also the position to which the electrode roller returns. The operator who has held the foot treadle lever pad 64 depressed throughout both forward and backward movements now releases the same and the clamping wings 91, 92 fall back away from the horn and below the table 42.

From what has just been said it will be evident that the position of the first weld spot center *a* of the seam A (Figs. 9 and 10) is located an exact desired distance from the seam edge by the proper adjustment of the leaving edge of the cam section 222 of the shaft head relative to the stop point of engagement of the contact lever arm projection 26 shown in Fig. 2. In reality this adjustment is made by shifting the contact lever arm projection by movement of the switch box 191 on the shaft 195 and relative to the bracket 192. It is the leaving edge of the cam section 222 which determines when the welding contacts 211, 213 come together which is when the contact lever arm projection rides off of the cam.

The position of the last weld spot center *z* is located an exact desired distance from the first spot *a* or in other words from the adjacent seam edge by the proper adjustment of the cam 222 on the shaft head. In this case it is the beginning edge of the cam 222 which picks up the lever arm projection 226 and breaks the welding circuit at the contacts 211, 213.

The completely welded can body B still resting upon the horn 24 is ready for discharge. It may be removed in any suitable manner, Figs. 2 and 7 showing a simple can discharge yoke attachment on the front of the horn for this purpose. The horn is provided on its outer surface with two diagonally disposed side grooves 255 which extend back from the front of the horn to a position behind the clamping jaws 91, 92. The can discharge yoke is in the shape of a long, narrow U and is formed with a front handle grip section 256 and side legs 257. The legs 257 slide within the horn grooves.

The yoke is only as wide as the horn and the outer walls of the side legs as shaped to conform with the cylindrical surface of the horn. The welded can body B on the horn therefore encircles the legs of the discharge yoke.

The inner end of each side leg 257, where the legs extend beyond the can body, is projected laterally as at 258 (Figs. 2 and 7). These projections provide abutments which engage behind the can body, when the discharge yoke is pulled forward, and slide the body forward and off of the horn.

Reference should now be had to Fig. 6 wherein are shown exemplary wiring circuits associated with the physical elements of the welding apparatus already described and which are adapted to the carrying out of the method steps of the present invention.

The proper electrical energy may be brought into the machine from a suitable source of supply by way of lead wires 275, 276 which preferably enter directly into a thyrathron welding switch panel 277 such as is now used in commercial electric weldings, this element per se however forming no part of the present invention. The electric motor for causing forward and reverse rotation of the feed worm 167 to effect the forward and backward movement of the carriage block 142 with its roller electrode 26 is of the reverse motor type and is designated by the numeral 278.

A wire 279 connects one side of the motor to the lead wire 275. A wire 281 connects the lead wire 276 to a treadle operated switch 282 and a wire 283 connects the opposite side of the treadle switch with the opposite side of the motor. The switch 282 is mechanically closed each time the treadle pad 64 is depressed and the switch opens again as soon as the treadle returns to unoperated position as will now be described.

As shown in Fig. 2 the lower end of the treadle connecting rod 66 carries a pin 284 which engages and lifts a switch lever 285 of the treadle switch 282. When the body clamping jaws and parts moved by the actuation of the foot treadle are in the position shown in Fig. 2 the switch 282 is closed and the motor 278 operates either in forward or reverse. When the welded can body B is being discharged from the horn or when a body blank 21 is being placed into the machine the motor 278 is dormant. Thus it will be seen that the operator has control of the motor operation through the foot treadle.

A suitable reversing switch 286 (Fig. 6) is connected in the motor circuit by wires 287, 288 which take off from the respective wires 279, 283. Such reversing switch construction is well known and constitutes a standard part of reversing motors. It is thought, therefore, that further detailed description of the switch is unnecessary other than to say that the switch is timed to change from forward to reverse at the end of the forward travel of the movable electrode and to change back to forward again when the electrode has completed its rearward travel.

The electrical energy for welding is preferably fed from the thyrathron panel 277 into the primary coil of the welding transformer 175. Wires 292, 293 connect the panel with the transformer primary winding. The secondary winding of the transformer is electrically connected to the welding electrodes by the respective bars and other connections already described, that is by the members 181, 182 and 183 for the roller electrode 26 and by the bars 177 and 178 for the electrode 25. To simplify the wiring diagram these members will be collectively indicated as wires 294, 295.

The welding current is broken at the switch 190 by breaking of the primary circuit within the thyrathron panel 277. As indicated in Fig. 6 the contacts 211, 213 contained within the switch box 191 are properly connected to the thyrathron panel by wires 296, 297 and welding energy cannot be supplied to the electrodes 25, 26 as long as there is no current flowing in the primary of the transformer 175 by way of the switch 190. It is this precise control of the timing of the welding spots in the seam A and the particular placing of the first and last weld spots *a* and *z* relative to the seam ends that produces a welded side seam which, while fully merged together for the entire seam length, does not have any extrusion of metal at the seam ends.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. The method of welding the side edges of a can body constructed of relatively thin light gauge sheet metal to provide a longitudinally extending side seam, which consists in bringing together the side edges of a metal body blank into overlapping relationship, welding the lapped portions of the blank from one end to the other by progressively interfusing such portions in a series of lineally positioned spot welds the areas of adjacent spots overlapping to provide a continuous fused welded zone in the seam, and timing the beginning and ending of the welding operation to locate the two end spot welds constituting the ends of the seam so that the boundaries of their fused areas terminate at the end edges of the seam with such fused areas fully contained therein.

2. The method of welding relatively thin metallic light gauge sheet material to provide a longitudinally extending seam, which consists in placing the sheet material so that the side edges are in engagement and in position, the while producing a welded seam by progressively interfusing the engaged sections from one end of the seam to the other in a series of lineally disposed spot welds the centers of which are spaced apart a predetermined distance to insure an overlapping of the areas of adjacent spots, and timing the beginning of the welding operation to locate the first end spot weld of the seam so that the boundary of its fused area terminates at the beginning seam edge and with the said fused area fully contained within the seam edge.

3. The method of welding the side edges of a metallic can body constructed of relatively thin light gauge sheet metal to provide a longitudinally extending side seam, which consists in bringing together into overlapped and butted relation an offset seam section of a side edge of the metal body blank and a straight section of a side edge of the blank so that the straight edge is seated within the offset section, clamping and holding the positioned parts of the can body the while welding the edge parts in a seam extending along the seated straight edge and the offset section by progressively interfusing the engaged and seated sections from one end to the other in a series of lineally positioned spot welds, the centers of which are spaced apart a predetermined distance so as to provide an overlapping of the areas of adjacent spots in a continuously fused welded seam, and timing the welding operation to locate the end spot welds which constitute the ends of the seam so that the boundaries of their fused areas terminate at the end edges of the seam and with such fused areas fully contained therein thereby preventing any metal of the side seam from extending beyond the marginal confines of the blank.

JOHN H. MURCH.